(12) United States Patent  (10) Patent No.: US 7,526,501 B2
Albahari et al.  (45) Date of Patent: Apr. 28, 2009

(54) STATE TRANSITION LOGIC FOR A PERSISTENT OBJECT GRAPH

(75) Inventors: Benjamin Albahari, Seattle, WA (US); Daniel G. Simmons, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 225 days.

(21) Appl. No.: 11/550,574

(22) Filed: Oct. 18, 2006

(65) Prior Publication Data

US 2007/0282916 A1 Dec. 6, 2007

Related U.S. Application Data

(60) Provisional application No. 60/746,856, filed on May 9, 2006.

(51) Int. Cl.
*G06F 17/30* (2006.01)
(52) U.S. Cl. ...................................... 707/102
(58) Field of Classification Search ................. 707/100, 707/101, 102, 103 R, 103 Y, 103 X, 103 Z; 710/53; 711/3, 126, 141–146; 345/557; 709/234
See application file for complete search history.

(56) References Cited

U.S. PATENT DOCUMENTS

| | | | |
|---|---|---|---|
| 5,449,293 A | 9/1995 | Chang et al. | |
| 5,576,954 A | 11/1996 | Driscoll | |
| 5,717,913 A | 2/1998 | Driscoll | |
| 6,128,624 A | 10/2000 | Papierniak et al. | |
| 6,175,837 B1 | 1/2001 | Sharma et al. | |
| 6,341,277 B1 | 1/2002 | Coden et al. | |
| 6,341,289 B1 | 1/2002 | Burroughs et al. | |
| 6,556,983 B1 | 4/2003 | Altschuler et al. | |
| 6,591,275 B1 | 7/2003 | Russell et al. | |
| 6,609,133 B2 | 8/2003 | Ng et al. | |
| 6,735,593 B1 | 5/2004 | Williams | |
| 6,836,777 B2 | 12/2004 | Holle | |
| 6,847,980 B1 | 1/2005 | Benitez et al. | |
| 7,054,877 B2 | 5/2006 | Dettinger et al. | |
| 7,058,655 B2 * | 6/2006 | Goldberg et al. | 707/103 R |

(Continued)

FOREIGN PATENT DOCUMENTS

EP 1 457 907 A 9/2004

(Continued)

OTHER PUBLICATIONS

Chen. "The Entity-Relationship Model—Toward a Unified View of Data" ACM Transactions on Database Systems, vol. 1, Issue 1, Mar. 1976, pp. 9-36.

(Continued)

*Primary Examiner*—Diane Mizrahi
(74) *Attorney, Agent, or Firm*—Amin, Turocy & Calvin, LLP

(57) ABSTRACT

The claimed subject matter provides a system and/or a method that facilitates handling a change associated with a database. An interface that can receive data associated with a change to data via an object graph. A state transition logic component that can maintain the change related to the object graph utilizing a context and a respective set of rules, the context employs metadata to view the object graph with an abstraction of at least one of an entity and a relationship.

18 Claims, 12 Drawing Sheets

U.S. PATENT DOCUMENTS

| | | | |
|---|---|---|---|
| 7,062,502 | B1 | 6/2006 | Kesler |
| 7,096,216 | B2 | 8/2006 | Anonsen |
| 7,158,994 | B1 | 1/2007 | Smith et al. |
| 7,162,721 | B2* | 1/2007 | Ali et al. .................. 719/310 |
| 2001/0047372 | A1 | 11/2001 | Gorelik et al. |
| 2003/0004964 | A1 | 1/2003 | Cameron et al. |
| 2003/0005019 | A1 | 1/2003 | Pabla et al. |
| 2003/0046266 | A1 | 3/2003 | Mullins et al. |
| 2003/0105732 | A1 | 6/2003 | Kagalwala et al. |
| 2003/0200533 | A1 | 10/2003 | Roberts et al. |
| 2003/0217128 | A1 | 11/2003 | Yanosy |
| 2003/0229640 | A1 | 12/2003 | Carlson et al. |
| 2004/0006549 | A1 | 1/2004 | Mullins et al. |
| 2004/0015474 | A1 | 1/2004 | Anonsen et al. |
| 2004/0015488 | A1 | 1/2004 | Anonsen et al. |
| 2004/0015489 | A1 | 1/2004 | Anonsen et al. |
| 2004/0015509 | A1 | 1/2004 | Anonsen et al. |
| 2004/0015814 | A1 | 1/2004 | Trappen et al. |
| 2004/0205303 | A1 | 10/2004 | Naveh et al. |
| 2005/0027675 | A1 | 2/2005 | Schmitt et al. |
| 2005/0027720 | A1 | 2/2005 | Schmitt |
| 2005/0027732 | A1 | 2/2005 | Kalima |
| 2005/0044089 | A1 | 2/2005 | Wu et al. |
| 2005/0097108 | A1 | 5/2005 | Wang et al. |
| 2005/0097187 | A1 | 5/2005 | Thompson et al. |
| 2005/0138052 | A1 | 6/2005 | Zhou et al. |
| 2005/0149555 | A1 | 7/2005 | Wang et al. |
| 2005/0149907 | A1 | 7/2005 | Seitz et al. |
| 2006/0184568 | A1 | 8/2006 | Barcia |
| 2006/0195460 | A1* | 8/2006 | Nori et al. .................. 707/100 |
| 2006/0195476 | A1* | 8/2006 | Nori et al. ................ 707/104.1 |
| 2006/0195477 | A1* | 8/2006 | Deem et al. .............. 707/104.1 |
| 2007/0266041 | A1* | 11/2007 | Beckman et al. ............ 707/102 |

FOREIGN PATENT DOCUMENTS

| | | |
|---|---|---|
| WO | WO 02/099702 A | 12/2002 |
| WO | WO2004095312 A | 11/2004 |
| WO | WO 2004/107205 A | 12/2004 |

OTHER PUBLICATIONS

"DB Interface Module User's Guide" (2005) Rogue Wave, Section 7.4https://www2.rougewave.com/support/docs/sourcepro/edition8/htm:/dcoore/7-4.html, 12 pages.

Acharya, et al. Discovering and Using Web Services in M-Commerce, SCE Computer Networking, University of Missouri-Kansas City, 2004, pp. 136-151, Springer-Verlag Berlin Heidelberg 2005.

Australian Patent Office Search Report dated Apr. 27, 2007 for Australian Patent Application Serial No. SG 200508626-9, 3 Pages.

Bernes -Lee, et al. Uniform Resource Identifiers(URI) : Generic Syntax, The nternet Society , Aug. 1998, 40 pages.

Chen, et al. "Turning Relational DBMS into Nested Relational DBMS" (2005) 12 pages.

CiteSeer. evidence for Chen reference, 2004.

Davis, et al., Understanding Services for Integration Management, Department of Mathematical and Computer Sciences, The University of Tulsa, pp. 84-93, Springer-Verlag Berlin Heidelberg 2004.

Distibuted Management Task Force DMTF: "CIM Database Model White Paper" CIM Version 2.8, Nov. 3, 2003, pp. 1-56, retrieved from http://web.archive.org/web/20040414223542/www.dmtf.org/standards/published_documents/DSP0133.pdf, last accessed on Jun. 21, 2006.

European Search Report dated Mar. 15, 2007 for European Patent Application No. EP 06 10 0768, 2 pages.

European Search Report dated Mar. 28, 2007 for European Patent Application Serial No. EP 06 10 1151, 2 Pages.

European Search Report dated Jun. 21, 2006 for European Patent Application Serial No. EP 06 10 1024, 3 pages.

Gwyn Cole, et al. "A Guided Tour of the Common Information Model Repository", Jan. 10, 2003, 16 pages, retrieved from http://www.informit.com/articles//printerfriendly.asp?p=30482&rl=1>, last accessed on Jun. 21, 2006.

Mittal, et al., A Framework for eGovernace Solutions, Sep./Nov. 2004, vol. 48, 17 pages International Business Machines Corporation.

Site Dock: Product Overview, Copyright 2002-2003 William. (2 Pages).

* cited by examiner

STATE TRANSITION LOGIC FOR A PERSISTENT OBJECT GRAPH

CROSS-REFERENCE TO RELATED APPLICATIONS

This application claims the benefit of U.S. Provisional Patent Application Ser. No. 60/746,856 filed on May 9, 2006, entitled "STATE TRANSITION LOGIC FOR A PERSISTENT OBJECT GRAPH." This application is related to pending U.S. patent application Ser. No. 11/171,905 entitled "PLATFORM FOR DATA SERVICES ACROSS DISPARATE APPLICATION FRAMEWORKS" filed on Jun. 30, 2005, U.S. Patent Application Ser. No. 11/195,320 entitled "STORAGE API FOR A COMMON DATA PLATFORM" filed on Aug. 2, 2005, U.S. patent application Ser. No. 11/228,731 entitled "DATA MODEL FOR OBJECT-RELATIONAL DATA" filed on Sep. 16, 2005, and U.S. patent application Ser. No. 11/468,008 entitled "THE CONCEPT OF RELATIONSHIPSETS IN ENTITY DATA MODEL (EDM)" filed on Aug. 29, 2006. The entireties of the above-noted applications are incorporated by reference herein.

BACKGROUND

Data has become an important asset in almost every application, whether it is a Line-of-Business (LOB) application utilized for browsing products and generating orders, or a Personal Information Management (PIM) application used for scheduling a meeting between people. Applications perform both data access/manipulation and data management operations on the application data. Typical application operations query a collection of data, fetch the result set, execute some application logic that changes the state of the data, and finally, persist the data to the storage medium.

Traditionally, client/server applications relegated the query and persistence actions to database management systems (DBMS), deployed in the data tier. If there is data-centric logic, it is coded as stored procedures in the database system. The database system operated on data in terms of tables and rows, and the application, in the application tier, operated on the data in terms of programming language objects (e.g. Classes and Structs). The mismatch in data manipulation services (and mechanisms) in the application and the data tiers was not tolerable in the client/server systems and is even more of a problem in relation to muli-tiered sytems with different types of data. However, with the advent of the web technology (and Service Oriented Architectures) and with wider acceptance of application servers, applications are becoming multi-tier, and more importantly, data is now present in every tier.

In such tiered application architectures, data is manipulated in multiple tiers. In addition, with hardware advances in addressability and large memories, more data is becoming memory resident. Applications are also dealing with different types of data such as objects, files, and XML (eXtensible Markup Language) data, for example.

In hardware and software environments, the need for rich data access and manipulation services well-integrated with the programming environments is increasing. One conventional implementation introduced to address the aforementioned problems is a data platform. The data platform provides a collection of services (mechanisms) for applications to access, manipulate, and manage data that is well integrated with the application programming environment. However, such conventional architecture falls short in many respects. Some key requirements for such a data platform include complex object modeling, rich relationships, the separation of logical and physical data abstractions, query rich data model concepts, active notifications, better integration with middle-tier infrastructure.

In particular, it is a common scenario to persist an object graph to a database (e.g., or more generally, any source of data such as a file). Furthermore, the object graph can be the primary means of manipulating data within that database. Since the object graph is not a direct view on the database but rather a cached view of the database, a buffer of changes to the object graph can be maintained. The buffer of changes to the object graph can either be flushed to the database or discarded. Such changes to the object graph can be further maintained by a context. Various and disparate sets of rules can be utilized by a context to handle such changes associated with a database. Yet, efficient and/or optimized rules to handle the context can be complex in light of the plurality of referencing within object graphs.

SUMMARY

The following presents a simplified summary of the innovation in order to provide a basic understanding of some aspects described herein. This summary is not an extensive overview of the claimed subject matter. It is intended to neither identify key or critical elements of the claimed subject matter nor delineate the scope of the subject innovation. Its sole purpose is to present some concepts of the claimed subject matter in a simplified form as a prelude to the more detailed description that is presented later.

The subject innovation relates to systems and/or methods that facilitate manipulating data utilizing an object graph based at least in part upon a context and a respective set of rules. A state transition logic component can enforce complex rules associated with maintaining a context related to an object graph. The state transition logic component can receive data (e.g., an instruction, a manipulation to data, a request to change data, any suitable data related to a change within a buffer, any suitable data related to a change in a context, any suitable data related to a change with the object graph, etc.) via an interface in order to enforce rules upon such data prior to manipulating the object graph. The state transition logic component can handle changes by employing specific rules associated with the context.

In accordance with an aspect of the subject innovation, the state transition logic component can utilize a rules component that can employ rules associated with managing the object graph. Furthermore, the rules component can employ various operations associated with the context such as an add object, a delete object, an accept change, and a reject change. In addition, the state transition logic component can utilize a context component that can maintain any changes associated with a buffer related to the object graph, wherein the context component utilizes metadata to view the object graph with an abstraction of at least one entity and/or at least one relationship. In other aspects of the claimed subject matter, methods are provided that facilitates utilizing a complex set of rules to maintain a context related to an object graph to enable manipulation of data.

The following description and the annexed drawings set forth in detail certain illustrative aspects of the claimed subject matter. These aspects are indicative, however, of but a few of the various ways in which the principles of the innovation may be employed and the claimed subject matter is intended to include all such aspects and their equivalents. Other advantages and novel features of the claimed subject matter will

DETAILED DESCRIPTION

Figure 1:
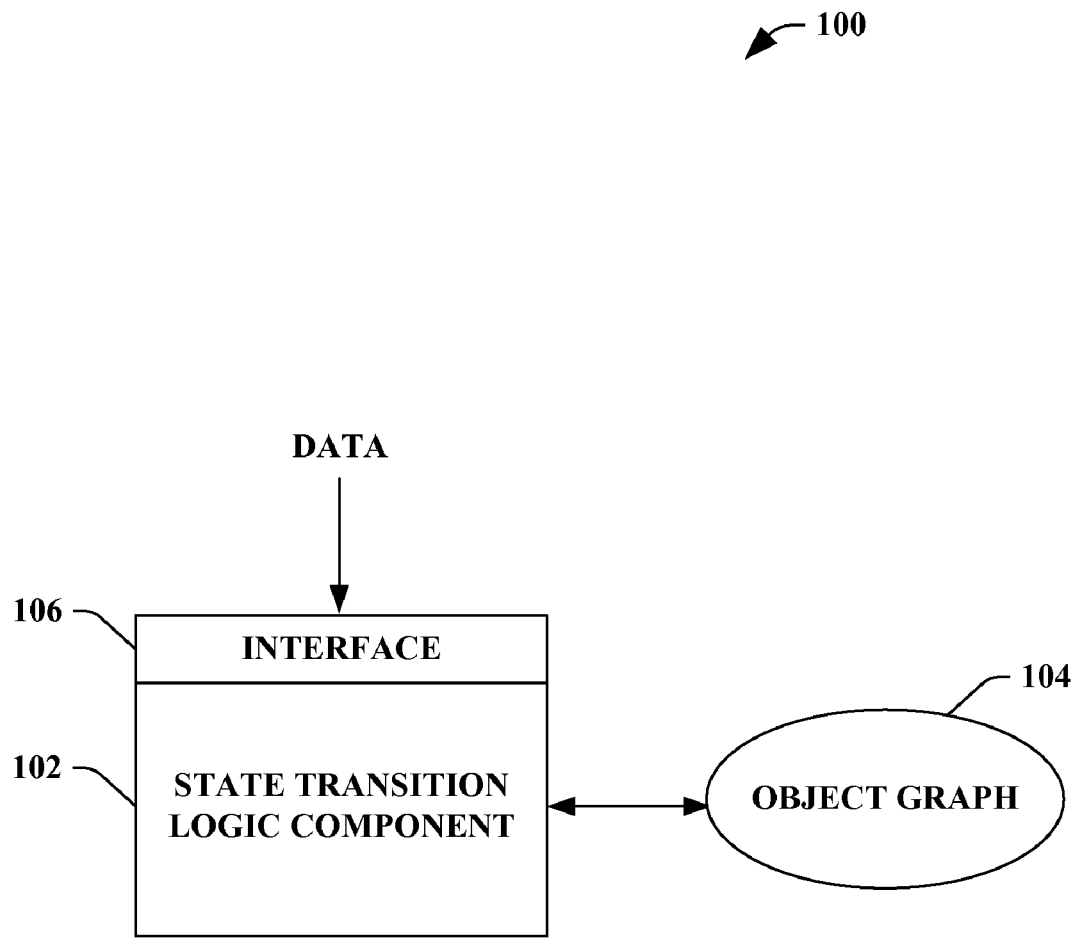
FIG. 1 illustrates a block diagram of an exemplary system that facilitates manipulating data utilizing an object graph based at least in part upon a context and a respective set of rules.

The claimed subject matter is described with reference to the drawings, wherein like reference numerals are used to refer to like elements throughout. In the following description, for purposes of explanation, numerous specific details are set forth in order to provide a thorough understanding of the subject innovation. It may be evident, however, that the claimed subject matter may be practiced without these specific details. In other instances, well-known structures and devices are shown in block diagram form in order to facilitate describing the subject innovation.

As utilized herein, terms "component," "system," "interface," "model," "processor," "entity," "relationship," and the like are intended to refer to a computer-related entity, either hardware, software (e.g. in execution), and/or firmware. For example, a component can be a process running on a processor, a processor, an object, an executable, a program, and/or a computer. By way of illustration, both an application running on a server and the server can be a component. One or more components can reside within a process and a component can be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter. Moreover, the word "exemplary" is used herein to mean serving as an example, instance, or illustration. Any aspect or design described herein as "exemplary" is not necessarily to be construed as preferred or advantageous over other aspects or designs.

Significant technology and industry trends have fundamentally changed the way that applications are being built. Line of business (LOB) applications that were constructed as monoliths around a relational database system 10-20 years ago must now connect with other systems and produce and consume data from a variety of disparate sources. Business processes have moved from semi-automated to autonomous. Service oriented architectures (SOA) introduce new consistency and coordination requirements. Higher level data services, such as reporting, data mining, analysis, synchronization, and complex integration have moved from esoteric to mainstream.

A common theme throughout all modern application architectures is a need to transform data from one form to another to have it in the right form for the task at hand. Today's applications sport a number of data transformers. A common transformation usually encapsulated as a proprietary data access layer inside applications is designed to minimize the impedance mismatch between application objects and relational rows. However, other mappings to navigate object-xml, and relational-xml exist. This impedance mismatch is not unique to applications. As SQL Server has evolved as a product, it has had to add a number of these modeling and mapping mechanisms across the services it provides within the product. Most of these mappings are produced in a point-to-point fashion and each requires a different means to describe the point-to-point transformation.

A fundamental insight is that most traditional data centric services such as query, replication, ETL, have been implemented at the logical schema level. However, the vast majority of new data centric services best operate on artifacts typically associated with a conceptual data model. The essence of our data platform vision is to elevate data services, across several products, from their respective logical schema levels to the conceptual schema level. Reifying the conceptual schema layer allows us to create services around common abstractions and share tooling, definition, and models across the majority of our data services.

For instance, an embodiment of the invention relates to programming against data and by raising the level of abstraction from a logical (relational) level to a conceptual (entity) level impedance mismatch can be eliminated for both applications and data services like reporting, analysis, and replication offered as part of the SQL Server product. The conceptual data model is made real by the creation of an extended relational model, called the entity data model (EDM), that embraces entities and relationships as first class concepts, a query language for the EDM, a comprehensive mapping engine that translates from the conceptual to the logical (relational) level, and a set of model-driven tools that help create entity-object, object-xml, entity-xml transformers. Collectively, all these services are called the Entity Framework. ADO.NET, the Entity Framework, and language integrated query innovations in C# and Visual Basic represent a next-generation data access platform.

Now turning to the figures, FIG. 1 illustrates a system 100 that facilitates manipulating data utilizing an object graph based at least in part upon a context and a respective set of rules. The system 100 can include a state transition logic component 102 that can enforce complex rules associated with maintaining a context related to an object graph 104. The state transition logic component 102 can receive any suitable data (e.g. an instruction, a manipulation to data, a request to change data, any suitable data related to a change within a buffer, any suitable data related to a change in a context, any suitable data related to a change with the object graph 104, etc.) via an interface 106 in order to enforce at least one rule upon such received data prior to manipulating the object graph 104. In particular, the object graph 104 can be persisted to a database (not shown) (e.g., and more generally, any source of data such as a file), wherein the object graph 104 can be the primary manner of manipulating data within such database. Yet, the object graph 104 may not be a direct view on the database but rather a cached view of the database allowing a buffer of changes (related to the object graph 104) to be maintained. The changes within the buffer can be either flushed to the database (e.g., applied, implemented, etc.) or discarded (e.g., not applied, not implemented, etc.). The state transition logic component 102 can maintain such changes by employing specific rules associated with the context, wherein the context maintains the buffer of changes related to the object graph 104.

Specifically, the state transition logic component 102 can provide rules associated with managing the object graph 104 such that the context can utilize metadata to view the object graph 104 with the abstraction of at least one entity and/or at least one relationship. The state transition logic component 102 can provide rules related to context in regards to the following operations: 1) add object (e.g., adds an object to the context); 2) delete object (e.g., marks an object as deleted in the context, and disconnects the object from the object graph); 3) accept changes (e.g., performs the following state transitions-added→unchanged, modified→unchanged, deleted→detached); and 4) reject changes (e.g. performs the following state transitions-added→detached, modified→unchanged, deleted→unchanged). It is to be appreciated that an entity maps in a straightforward manner to an object-both have a type and a set of properties (e.g., typical object oriented notion of a type, such as is utilized in C#, Java, etc.). Furthermore, it is to be appreciated and understood that a relationship maps to either a singleton object reference or a collection of references in the object graph 104. For instance, a collection in C# can be a type that implements ICollection<T>.

In addition, the system 100 can include any suitable and/or necessary interface component 106 (herein referred to as "interface 106"), which provides various adapters, connectors, channels, communication paths, etc. to integrate the state transition logic component 102 into virtually any operating and/or database system(s) and/or with one another. In addition, the interface component 106 can provide various adapters, connectors, channels, communication paths, etc., that provide for interaction with at least one of the disparate component, system, machine, application, process, computer, etc.

Furthermore, it is to be appreciated that the state transition logic component 102 can be utilized with the entity data model (EDM) (discussed above and not shown) that can extend the basic relational model with concepts like support for rich types (with inheritance and polymorphism) and relationships. The entity data model is intended to be a concrete conceptual model for a wide range of applications ranging from PIM (e.g., Personal Information Management) applications to Line-of-Business applications. In one example, the system can include a database runtime that implements the entity data model in a concrete manner, wherein the runtime includes at least one of the following: a mapping facility; a querying facility; and an updating facility that updates at least one of an entity and a relationship in a data source.

The central concepts in the EDM are entities and relationships. Entities describe real-world objects with independent existence, and are instances of Entity Types (e.g., Customer, Employee, book, shelf, keyboard, speaker, wall, house, street, globe, Earth, any suitable entity that can be a real-world object, etc.). An entity-set represents a collection of entities of the same entity type (e.g., Customers is a set of Customer instances, Employees is a set of Employee instances, etc.).

In most real-world applications, entities are related to other entities. The entity data model provides first class support for this via the notion of Relationships. Relationships are instances of Relationship Types, and express linkages between instances of two or more entity types (e.g., Employee WorksFor Department, where Employee is an entity type, Department is an entity type, and WorksFor is the Relationship type). A RelationshipSet represents a collection of relationship instances of the same type (e.g., WorksFor, HiredBy, Contains, PlacesOneOrMore, IsAvailableFromOneOrMore, any suitable collection of verbs that can describe a relationship between two or more entities, etc.).

An EntityType can define the principal data objects about which information has to be managed such as person, places, things or activities relevant to the application. An Entity can be an instance of an EntityType, wherein it can have a unique identity, independent existence, and forms the operational unit of consistency. In addition, an EntityType can have one or more properties of the specified SimpleType, ComplexType, or RowType. Properties can be either single-valued or multi-valued. Instances of an EntityType can be uniquely identified by the value of its identifying properties. This set of identifying properties can be referred to as an EntityKey. A ComplexType can represent a set of related information. Similar to EntityType, it consists of one or more properties of SimpleType, ComplexType, or RowType. However unlike EntityType, ComplexType is not associated with an EntityKey. RowType can be an anonymous type that is structurally similar to ComplexType except that it cannot participate in type-inheritance. Two (anonymous) RowType instances are comparable if their corresponding RowTypes have the same number, sequence and type of properties. While EntityTypes are like nouns of a data model, RelationshipTypes are the verbs that connect those nouns. A RelationshipType can be described over two or more participating EntityTypes. The EDM can support two kinds of RelationshipTypes, Association and Containment. An Association is like a peer-to-peer relationship while Containment is a parent-child relationship with specific membership semantics. EDM types can be contained within some namespace. The Schema concept defines a namespace that describes the scope of EDM types.

An EntitySet for an EntityType holds instances of its EntityType or any of its subtypes. Multiple EntitySets may be defined for a given EntityType. A RelationshipSet for a given relationship type may hold instances of that type. The relationship instance connects entity instances contained by the EntitySets participating in this RelationshipSet. A RelationshipSet description includes the RelationshipType and the corresponding EntitySets of the EntityTypes described in RelationshipType. EDM instance-based concepts like EntitySets and RelationshipSets are defined in the scope of an EntityContainer. Users can have one or more instances of EntityContainer. An EntityContainer can reference one or more Schemas.

The following examples are for the sole purpose of illustrating the various linkage and/or connection between various EntityTypes and RelationshipTypes and such examples are not to be limiting on the claimed subject matter. For instance, the EntityType can be defined and named "SalesPerson" and the EntityType can be defined and named "Automobile," while the RelationshipType can be defined and named "Sells." Following the same example, the EntityType can be defined and named "AutomobileCompany," while the RelationshipType can be defined and named "IsManufacturedBy." Thus, the following is described by the type structure: the SalesPerson type "Sells" Automobile type and Automobile type "IsManufacturedBy" AutomobileCompany type. In addition, it is to be appreciated and understood that the RelationshipType is an AssociationType, while the RelationshipType is a ContainmentType. Moreover, an example of relationship would be: A customer places one or more orders, an order contains order details, a product is available from one or more suppliers, and so on and so forth. In these sentences, entities are in italics and relationships are underlined. The relationship concept is borrowed from the classic Entity-Relation data model and made a first-class concept in the entity data model.

Figure 2:
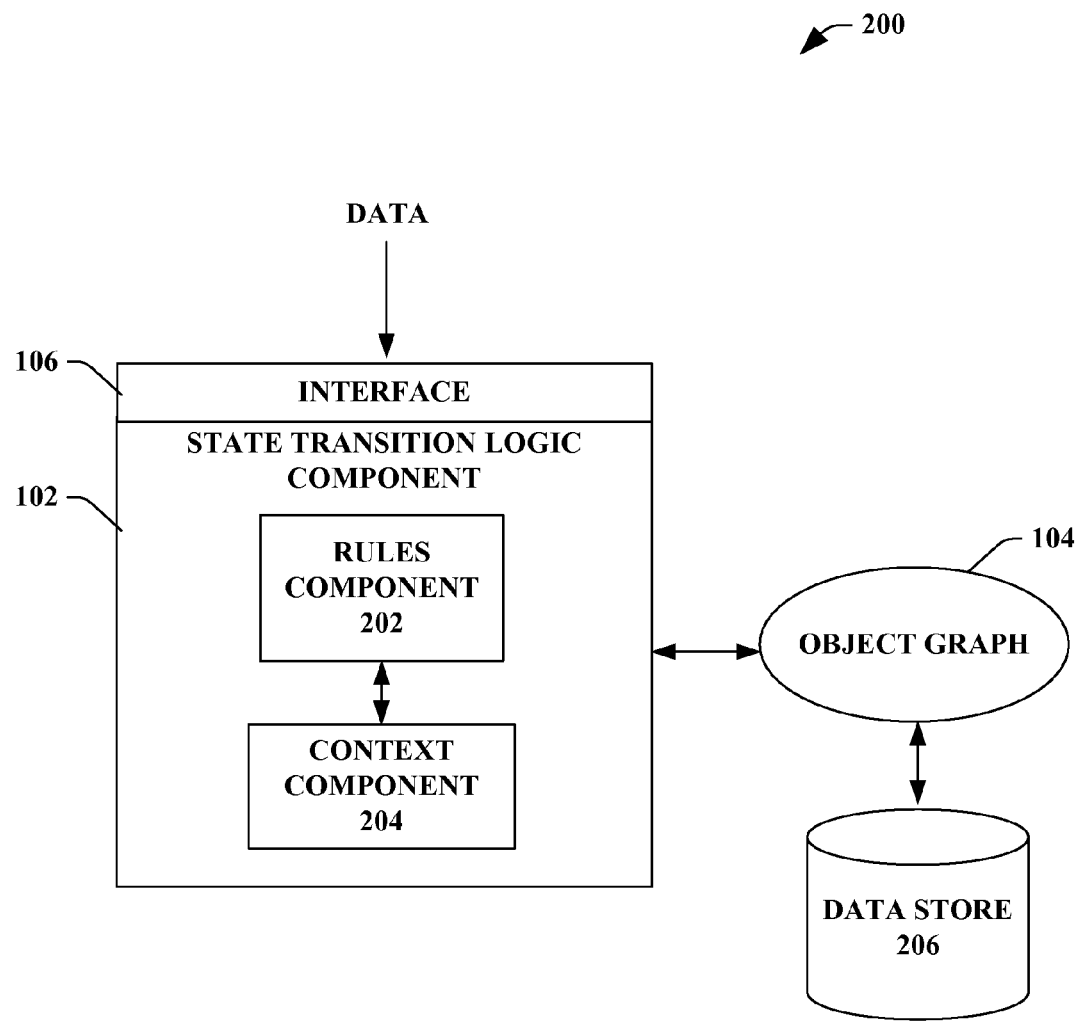
FIG. 2 illustrates a block diagram of an exemplary system that facilitates utilizing a complex set of rules to maintain a context related to an object graph to enable manipulation of data.

FIG. 2 illustrates a system 200 that facilitates utilizing a complex set of rules to maintain a context related to an object graph to enable manipulation of data. The system 200 can include the state transition logic component 102 that can employ a complex set of rules associated with handling changes/manipulations with the object graph via a context. In other words, the set of rules relate to the context in order to maintain at least one change within a buffer for the object graph 104. It is to be appreciated that the set of state transition rules can be complex, particularly with regards to handling references between objects in the object graph 104. Furthermore, the model utilized by the system 200 can be based on a context that utilizes metadata to view the object graph 104 with the abstraction of entities and relationships.

The state transition logic component 102 can utilize a rules component 202 that can employ specific rules associated with handling changes maintained by a context, wherein such changes are buffered and relate to the object graph 104. As depicted, the rules component 202 is illustrated as being incorporated into the state transition logic component 102; however, it is to be appreciated that the rules component 202 can be a stand-alone component, incorporated into the state transition logic component 102, and/or any combination thereof. The rules component 202 can apply and enforce the following rules to object in the context that maintains the object graph 104: 1) a detached object cannot be related to a non-detached object; and 2) a deleted object cannot be related to a non-deleted object. The rules component 202 can enforce the following operations to the object graph 104 via the context utilizing metadata to view such object graph with entity and/or relationship abstracts:

Add Object—Adds an object to the context
    Delete Object—Marks an object as deleted in the context, and disconnects the object from the object graph
    AcceptChanges—Performs the following state transitions:
        Added→Unchanged
        Modified→Unchanged
        Deleted→Detached
    RejectChanges—Performs the following state transitions:
        Added→Detached
        Modified→Unchanged
        Deleted→Unchanged The state transition logic component 102 can further utilize a context component 204 that can maintain any changes associated with a buffer related to the object graph 104. The object graph 104 can be the primary manner on manipulating data within a data store 206 (discussed infra). Since the object graph 104 is not a direct view on the data store 206 but rather a cached view of the data store 206, a buffer of changes to the object graph 104 is maintained that can either be flushed to the data store 206 or discarded. Such changes can be maintained by the context component 204, wherein the context component 204 utilizes the set of rules (via the rules component 202) to handle changes associated therewith. A depicted, the context component 204 can be incorporated into the state transition logic component 102; yet it is to be appreciated and understood that the context component 204 can be a stand-alone component, incorporated into the state transition logic component 102, incorporated into the object graph 104, incorporated into the data store 206, and/or any combination thereof Moreover, it is to be appreciated that the context component can utilize metadata to view the object graph with the abstraction of an entity and/or a relationship.

The system 200 can further include a data store 206 that can include/store any suitable data related to the state transition logic component 102, the object graph 104, a context, etc. It is to be appreciated that the data store 206 can be, for example, either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable programmable ROM (EEPROM), or flash memory. Volatile memory can include random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM). The data store 206 of the subject systems and methods is intended to comprise, without being limited to, these and any other suitable types of memory. In addition, it is to be appreciated that the data store 206 can be a server, a database, a hard drive, and the like.

Figure 3:
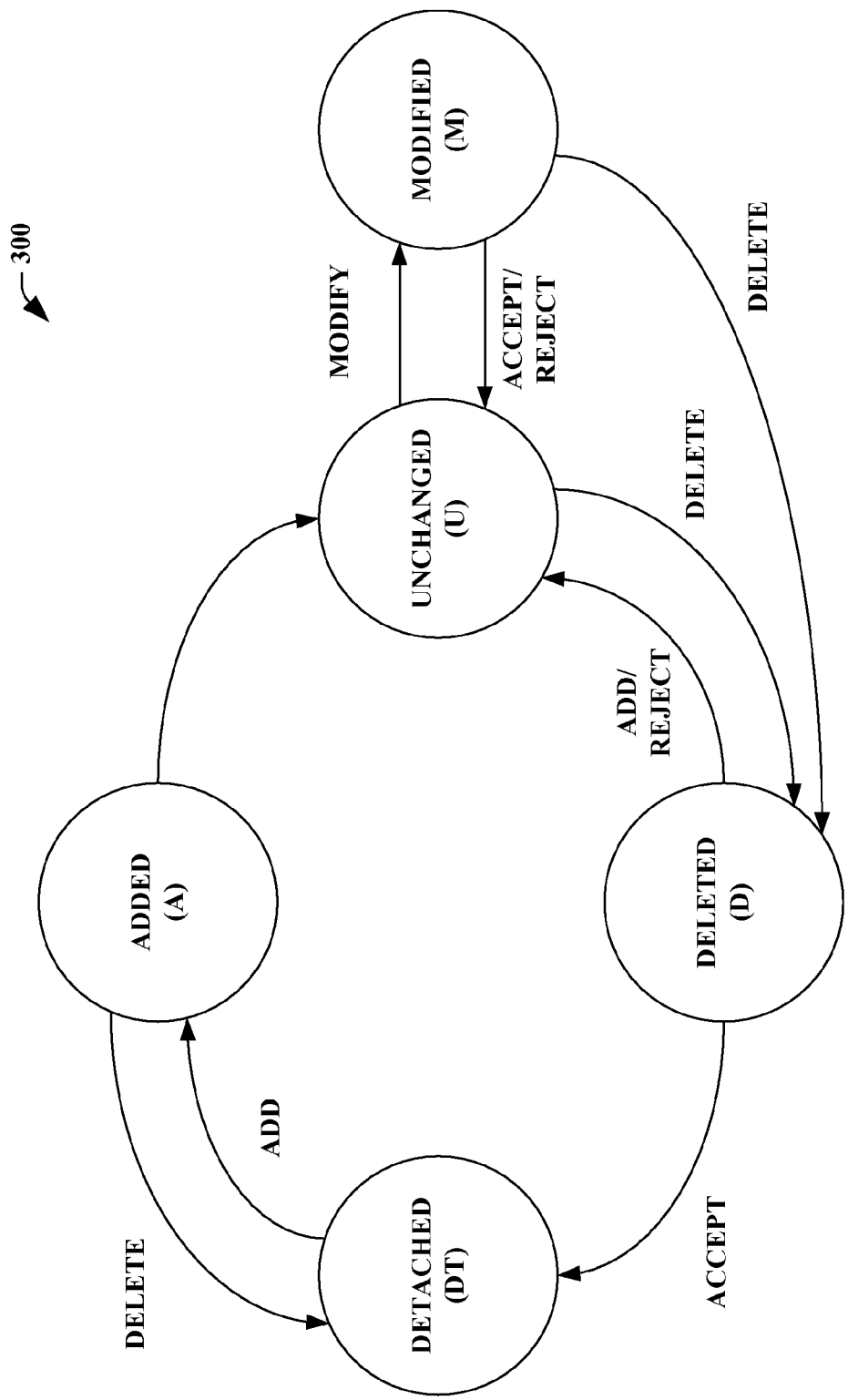
FIG. 3 illustrates a block diagram of an exemplary object state transition that facilitates implementing rules associated with maintaining a context associated with an object graph and respective manipulations.

FIG. 3 illustrates various object state transitions 300 that facilitate implementing rules associated with maintaining a context associated with an object graph and respective manipulations. It is to be appreciated that the following shorthand notations can be utilized for the various states (e.g., described in examples with state diagrams illustrated in FIGS. 4, 5, and 6) within the object state transitions 300: added can be referred to as (A); unchanged can be referred to as (U); deleted can be referred to as (D); detached can be referred to as (DT); and modified can be referred to as (M). Moreover, it is to be appreciated that the object state transitions 300 can be utilized by the state transition logic component 102 in order to implement specific rules associated with a context in order to maintain changes/manipulations associated with the object graph 104.

Figure 4:
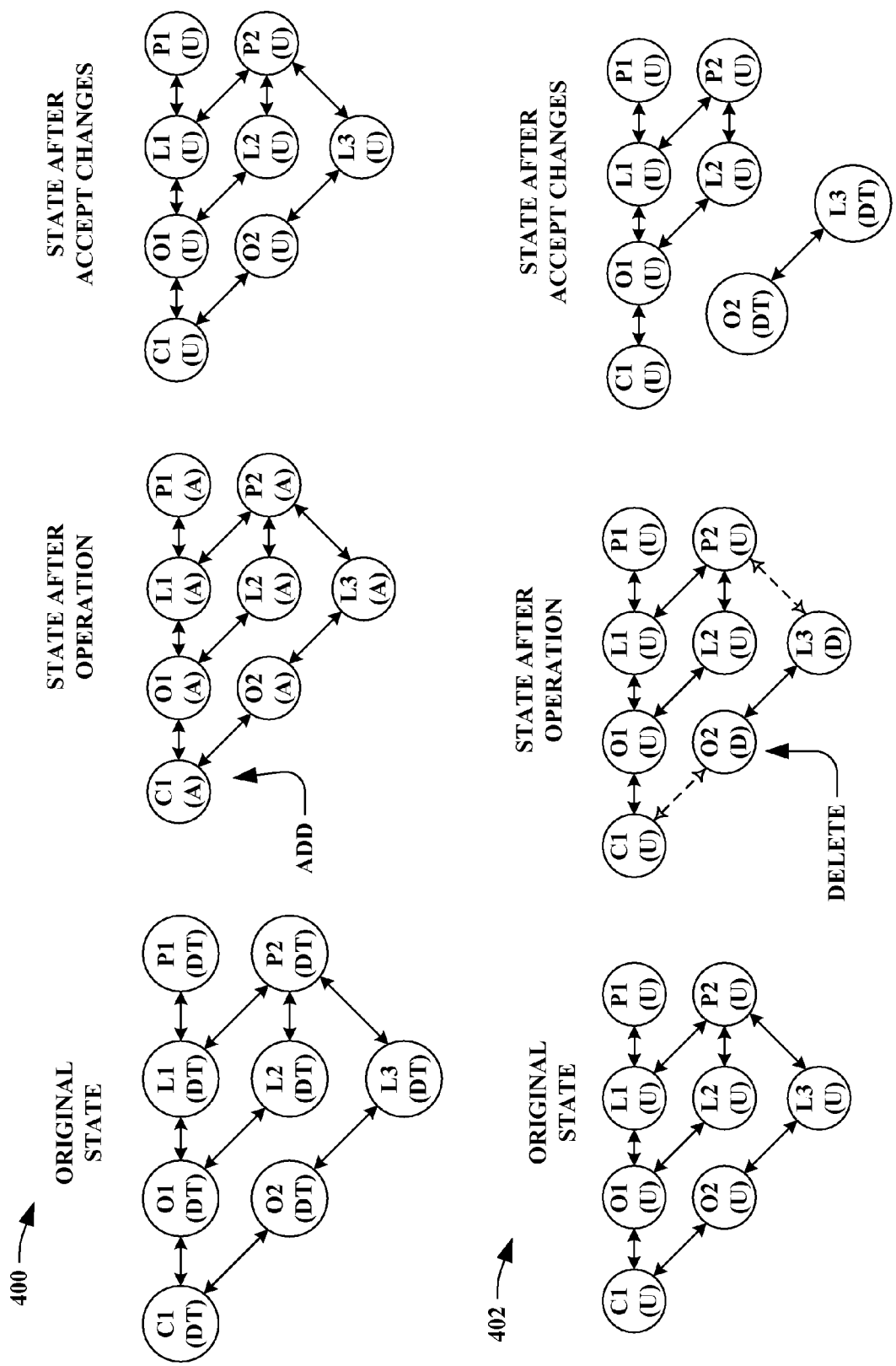
FIG. 4 illustrates a block diagram of an exemplary series of state diagrams associated with adding and/or deleting an object related to a context.

FIG. 4 illustrates a series of state diagrams 400 and 402 associated with adding and/or deleting an object related to a context. It is to be appreciated that the following state diagrams utilize a general example for illustration and explanatory purposes. Thus, it is to be understood that there can be any suitable number of state diagrams and/or examples associated with object graphs, contexts, data, data stores, databases, etc. The subject innovation can utilize an example from a sample database and/or data store, where there are instances of entity types Customer (C), Order (O), Line (L), and Product (P). There are 1-Many relationships between Customer and Order, Order and Line, and Product and Line. The relationship between order and Line is a parent-child relationship, where the lifetime of the child is dependent upon the lifetime of the parent.

The state diagram 400 illustrates adding an object that is detached in accordance with the claimed subject matter (e.g. utilizing the rules enforced and/or applied by the state transition logic component 102). The state diagram 400 depicts an "add" to an object starting in an original (e.g., detached state) to a state after operation (e.g., where an "add" is implemented) to a state after changes are accepted. It is to be appreciated that the state diagram 400 depicts adding C1 to the context, wherein this provides the addition of all other objects to the context as well upon the acceptance of the change. When adding an object that is detached: 1) the object is added to the context; and 2) transitively walks all relationships to add all other related objects to the graph. When adding an object that is already added: there is no operation. When adding an object that is unchanged/modified: throw an error. When adding an object that is deleted: revert the object to an unchanged state.

Turning to the state diagram 402, deletion of an object that is unchanged and/or modified is illustrated in accordance with the claimed subject matter (e.g., utilizing the rules enforced and/or applied by the state transition logic component 102). The state diagram 402 depicts a "delete" to an object that is unchanged/modified in an original state to a state after operation, and to a state after changes are accepted. When deleting an object that is unchanged/modified: 1) mark the object as deleted; 2) transitively delete all children (e.g., where the relationship is a parent-child relationship); 3) cauterize the relationships that the instance participates in; 4) disconnect the instance from the object graph; 5) remove the instance from any collection of objects that the instance participates in; and 6) set any reference to the instance to null. When deleting an object in added, deleted, or detached state: throw an error. It is to be appreciated that the state diagram 402 depicts removing O2 which also removes L3 from the graph (since L3 is a child of O2), and cauterizes the relationship between C1-O2 and L3-P2. Such cauterization between C1-O2 and L3-P2 is depicted with dotted lines and hollow arrow-heads in the state after operation (e.g., the hollow arrow-heads indicate the relationship instance does not exist in the object graph but is tracked as a deleted relationship instance in the context).

Figure 5:
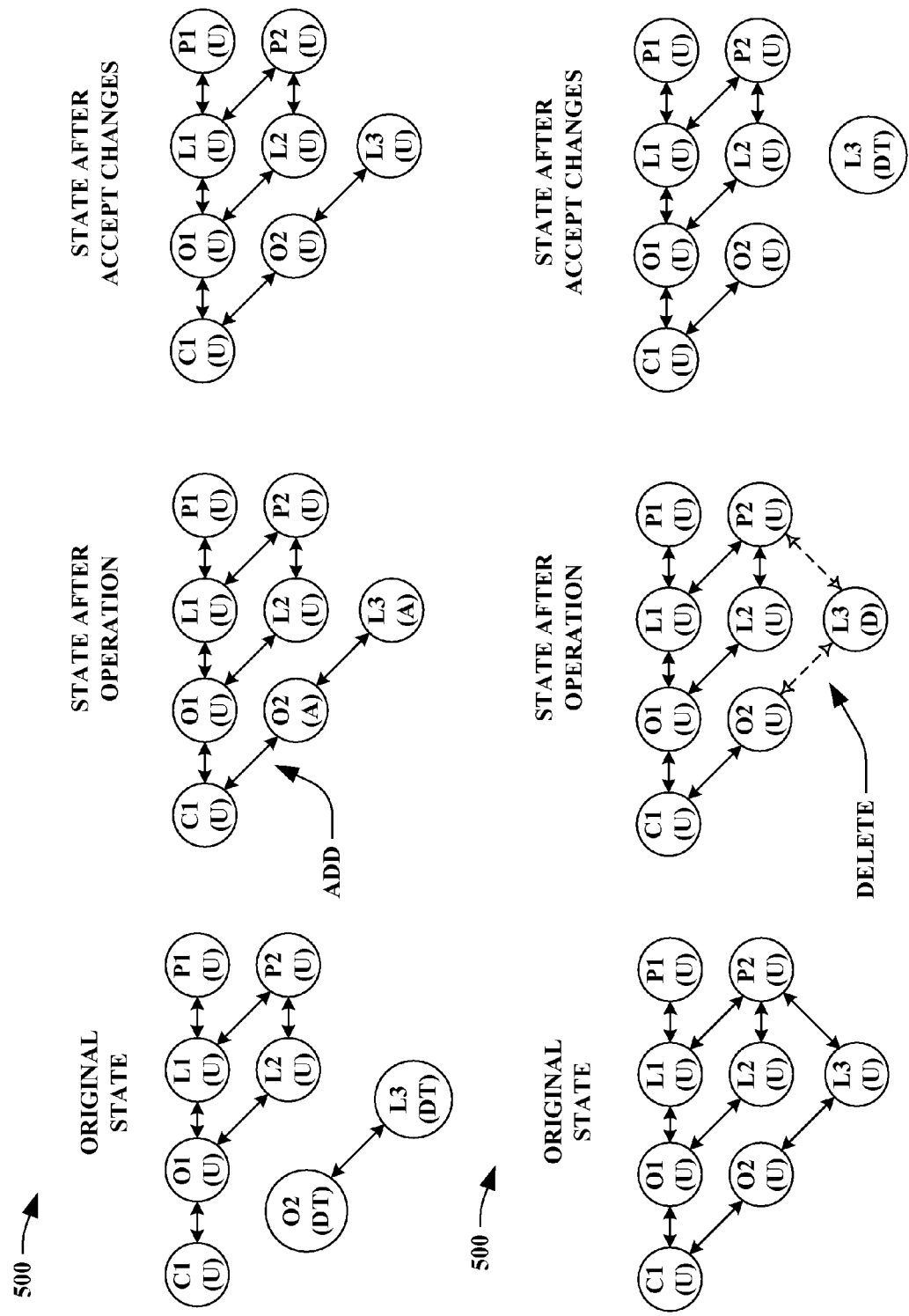
FIG. 5 illustrates a block diagram of an exemplary series of states related to adding and/or deleting relationship data from a context.

FIG. 5 illustrates a series of state diagrams 500 and 502 related to adding and/or deleting relationship data from a context. The context can track relationships between objects. A new reference in the object graph can be tracked in the context as a relationship instance in the added state. A removed or nulled reference in the object graph can be tracked in the context as a relationship instance in the deleted state. In a "pure" implementation, creating or deleting a relationship between X and Y should never effect the state of X and Y. The two exceptions to this are a transitive add and a child deletion.

To make an API (e.g., utilized with the state transition logic component and/or incorporated thereto and not shown) more usable, the practical concession is made such that creating a relationship between a detached object and a non-detached object has the effect of transitioning the detached object to the added state. For example, the state diagram 500 illustrates the addition of O2 and L3 instances (which are detached in the original state) to the unchanged C1 in the state after operation. Thus, after the changes are accepted, C1 includes O2 and L3 with relationships between C1-O2 and O2-L3.

In the example with a child deletion, the state diagram 502 is illustrated. If the relationship is a parent-child relationship, then deleting the relationship can delete the child. For instance, the operation of deleting the relationship between L3-O2 and L3-P3 can delete L3 in the state after changes are accepted (and thus leaving L3 detached).

The following table can illustrate the state changes that can occur when adding or deleting a relationship R between X and Y, where X and Y are in any possible state:

| State of Y | | State of X | | | |
|---|---|---|---|---|---|
| | | Detached | Added | Unchanged Modified | Deleted |
| Detached | Add R(X, Y) | No state changes | Y → Added R → Added | Y → Added R → Added | Throw |
| | Del R(X, Y) | No state changes | Throw | Throw | Throw |
| Added | Add R(X, Y) | Symmetric | R → Added | R → Added | R → Added X → Unchanged |
| | Del R(X, Y) | Symmetric | R → Detached If R is Containment | R → Detached If R is Containment then Y → Detached | Throw |

-continued

| State of Y | | Detached | Added | Unchanged Modified | Deleted |
|---|---|---|---|---|---|
| Unchanged Modified | Add R(X, Y) | Symmetric | then Y → Detached Symmetric | R → Added | Throw |
|  | Del R(X, Y) | Symmetric | Symmetric | If R is Added then R → Detached else if R is Unchanged/Modified then R → Deleted If R is Containment then Y → Deleted |  Throw |
| Deleted | Add R(X, Y) | Symmetric | Symmetric | Symmetric | Throw |
|  | Del R(X, Y) | Symmetric | Symmetric | Symmetric | Throw |

Figure 6:
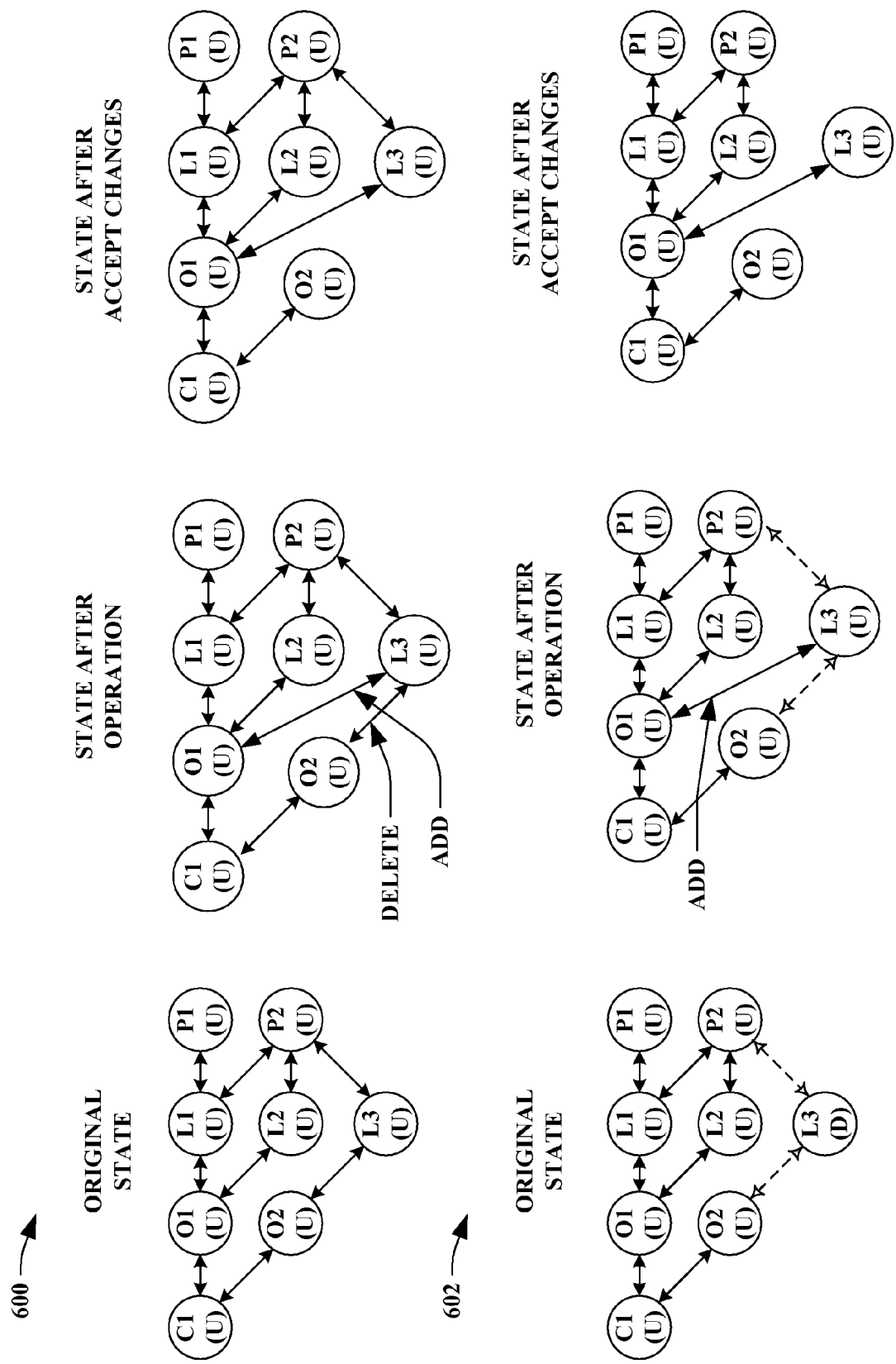
FIG. 6 illustrates a block diagram of an exemplary series of state diagrams associated with re-parenting relationships and/or re-adding deleted objects to a context.

FIG. 6 illustrates a series of state diagrams 600 and 602 associated with re-parenting relationships and/or re-adding deleted objects to a context. The state diagram 600 relates to re-parenting a relationship. A parent-child relationship can be created to a child object, where that child object already participates in a parent-child relationship. In this example, the existing parent-child relationship can be cauterized. In particular, the state diagram 600 illustrates L3 having a parent relationship added between O1-L3 while a parent-child relationship being deleted between O2-L3 at a state after operation. Moreover, the state after the changes being accepted depicts the relationship between O1-L3 while the relationship between O2-L3 is severed.

Turning to the state diagram 602, re-adding deleted objects is depicted. Adding a deleted object to a context or via a relationship transitions that object back to the unchanged state. The relationships that are cauterized may not be repaired. For instance, adding the relationship between O1-L3 can cause the cauterization of the relationships between O2-L3 and P2-L3. Such cauterization between O1-L3 and P2-L3 is depicted with dotted lines and hollow arrow-heads in the state after operation (e.g., the hollow arrow-heads indicate the relationship instance does not exist in the object graph but is tracked as a deleted relationship instance in the context).

Moreover, it is to be appreciated that the state transition logic component (not shown but described supra and infra) can employ an accept changes operation and a reject changes operation. When accept changes is on an object that is detached: this should not occur since the system has been designed so that the only operation that is valid on an entity in a detached state is add (e.g. add/delete relationships to these entities as well but add is the only operation directly on the entity itself). When accept changes is on an object that is added/modified: transitions the object to unchanged. When accept changes is on an object that is unchanged: no operation. When an accept changes is on an object that is deleted: transitions the object to detached. When reject changes is on an object that is detached: this is rarely possible. When reject changes is on an object that is added: 1) transitions the object to detached; and 2) cauterize the relationships the instance participates in (e.g., disconnect the instance from the graph). When the reject changes is on an object that is modified/deleted: transition the object to unchanged. When the reject changes is on an object that is unchanged: no operation.

Figure 7:
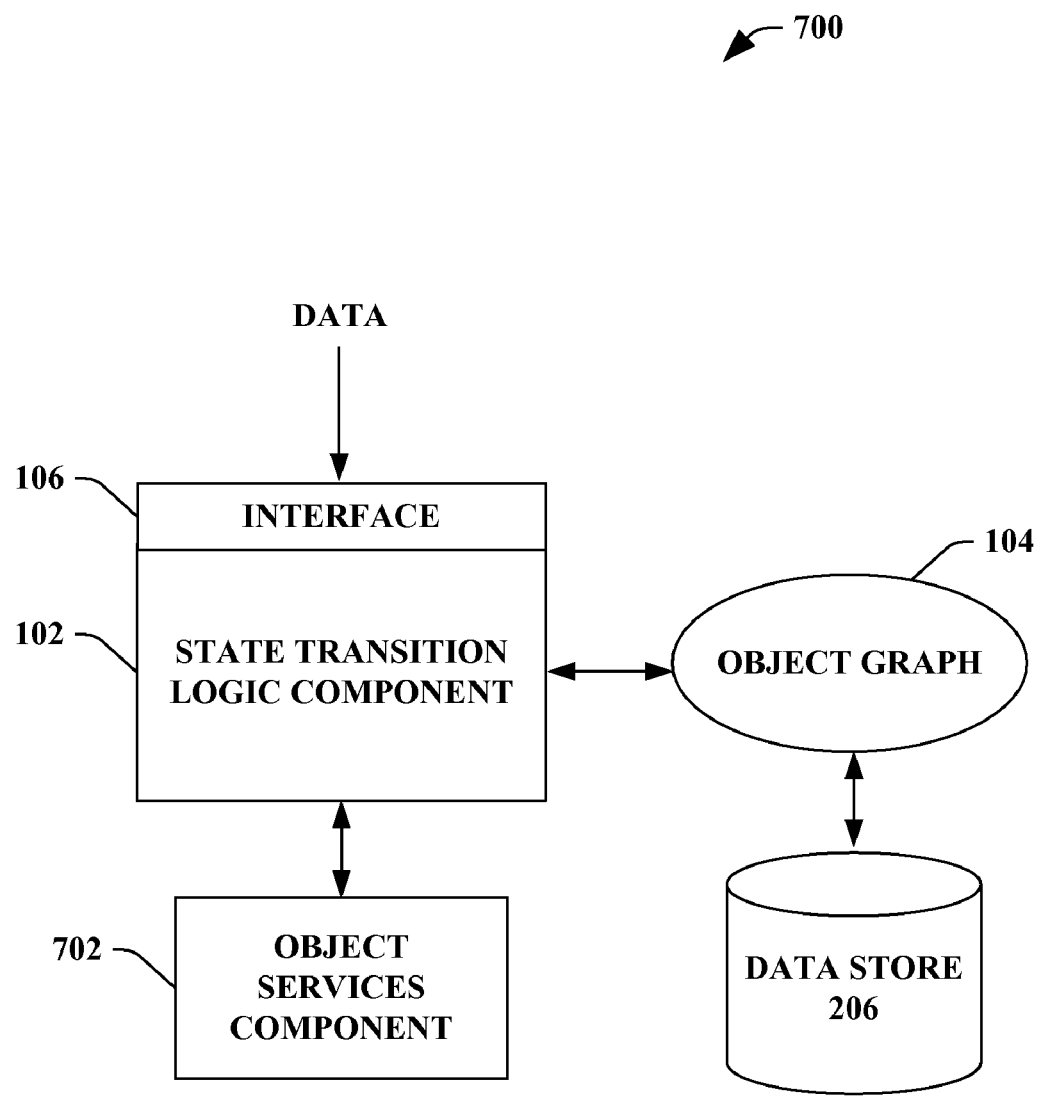
FIG. 7 illustrates a block diagram of an exemplary system that facilitates employing a plurality of object services in accordance with the subject innovation.

FIG. 7 illustrates a system 700 that facilitates employing a plurality of object services in accordance with the subject innovation. The system 700 can further include an object services component 702. The object services component 702 can employ an object services layer that provides an application-object programming surface over a .NET data provider (typically, a Mapping Provider). The object services layer can be responsible for mapping structured values retrieved from a database through the underlying providers into CLR objects. It also keeps track of changes made to these objects and enables these changes to be saved back to the database. The Object Services layer consists of the following services: 1) Sessions; 2) Materialization; 3) State Management with identity map, shadow state, and change tracking; and 4) Query.

The object services component 702 can include an ObjectContext class that encapsulates the state associated with a session, and is the primary object that all other objects in ObjectServices deal with. It acts as a mapped conduit through which other objects communicate with the underlying provider. An ObjectContext class is targeted for ease-of-use and, in the common case, is the starting point in the Object Services API. It is simply an aggregator of various other pieces—most specifically a connection, a cache, and metadata for the associated objects. An application may have more than one active session by creating multiple instances of ObjectContext.

Application objects can be mapped to (and from) EDM entities via an O-C Map. This mapping is managed by the Mapping Services component (not shown). The ObjectMaterializer class utilizes this mapping to materialize data returned from a .NET data provider as type CLR classes.

ObjectServices can manage the state of all objects maintained within the cache. This supports the basic application pattern of: (a) query for some objects, (b) navigate and make changes to those objects, and (c) send the pending changes back to the database. In order to support this pattern the ObjectServices infrastructure provides the following 3 services: 1) Identity Map; 2) Shadow State; and 3) Change Tracking.

Object Services maintains an identity map that maps EDM entities into CLR objects (and vice versa). An identity map ensures that an object gets loaded only once in that session by keeping a reference to the loaded objects in a map. Loading the object only once ensures a consistent view of changes to that object across references returned by multiple implicit or explicit queries within a context. The use of the identity map results in no duplicated materializations during queries as well as during implicit object loads during an object graph traversal.

Object Services, using the ObjectStateEntry and EntityKey classes, maintains bookkeeping information for each object loaded into a session. The ObjectStateEntry class manages the original vs. current values of the data and the state of the object relatives to the database (Added, Modified, Deleted, Unchanged, Detached). The EntityKey class encapsulates the database identity of the object. This shadow state keeps track of the original values of the object properties (including those EDM properties that were not mapped into the object). The ObjectStateManager associates objects and shadow state via the identity map.

Given the set of current values (of properties) and the set of original values, it is possible to automatically determine if an object has changed. The ObjectStateEntry class manages the current state of the object relative to the data contained within the database (Added, Modified, Deleted, Unchanged, or Detached). It also allows a given property to be marked as changed, without actually having to change the data associated with that property.

The object service component 702 can further employ a query function. Applications formulate their queries in terms of application objects. Queries may be issued in terms of LINQ expression trees or eSQL query strings. LINQ and eSQL queries are translated into canonical command trees in terms of the EDM, and delegated to the underlying provider (usually, the Mapping Provider). eSQL query strings are parsed into canonical commands by the same parsing service used by the Mapping Provider and LINQ trees are translated to canonical command trees by a separate translation component. The results of the queries are materialized into CLR objects by the Object Materializer, and then returned to the user.

Figure 8:
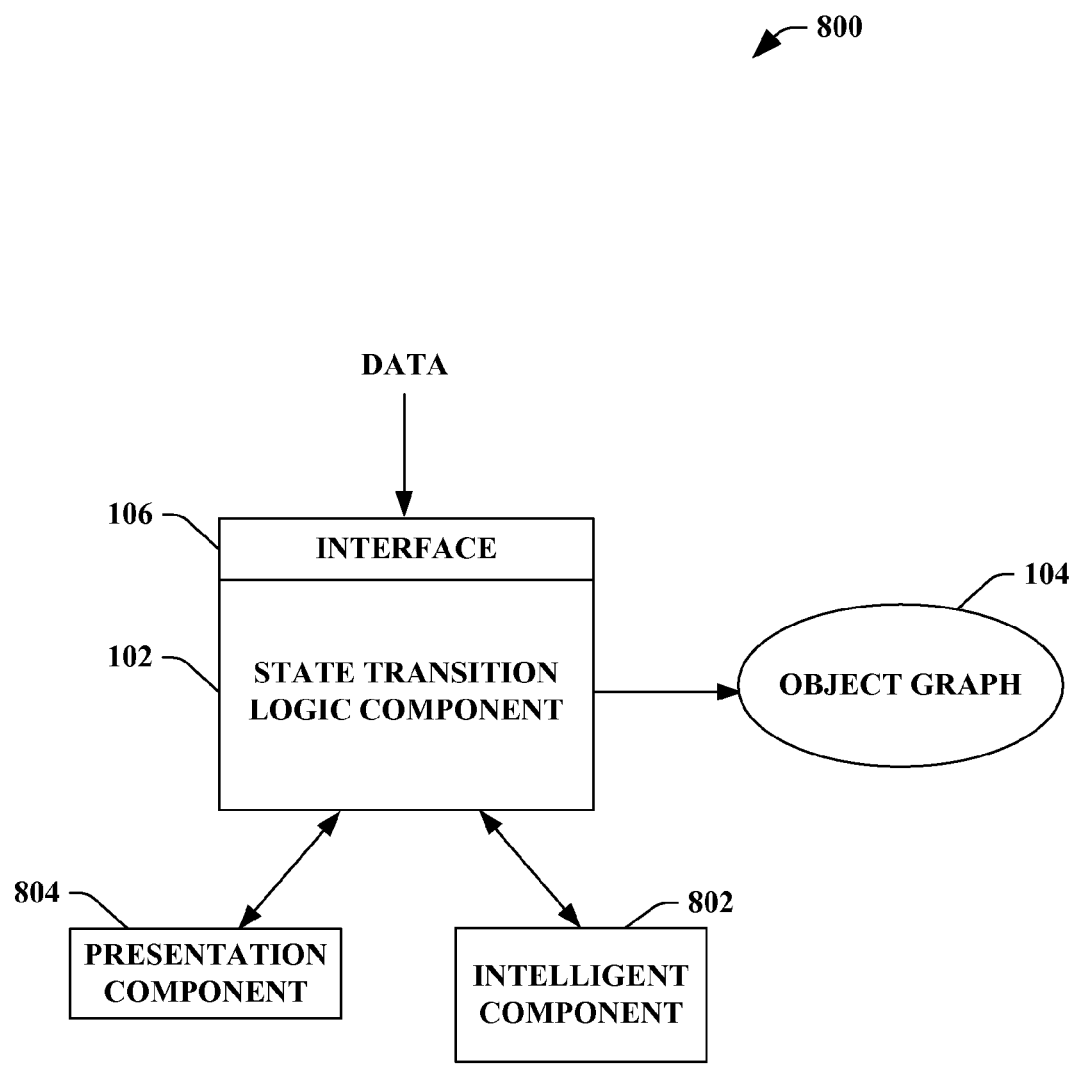
FIG. 8 illustrates a block diagram of an exemplary system that facilitates manipulating data utilizing an object graph based at least in part upon a context and a respective set of rules.

FIG. 8 illustrates a system 800 that facilitates manipulating data utilizing an object graph based at least in part upon a context and a respective set of rules. The system 800 can include the state transition logic component 102, the object graph 104, and the interface 106, that can all be substantially similar to respective components, graphs, and interfaces as described in previous figures. The system 800 further includes an intelligent component 802. The intelligent component 802 can be utilized by the state transition logic component 102 to facilitate maintaining changes to an object graph via a context and respective rules.

It is to be understood that the intelligent component 802 can provide for reasoning about or infer states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. Various classification (explicitly and/or implicitly trained) schemes and/or systems (e.g. support vector machines, neural networks, expert systems, Bayesian belief networks, fuzzy logic, data fusion engines . . . ) can be employed in connection with performing automatic and/or inferred action in connection with the claimed subject matter.

A classifier is a function that maps an input attribute vector, $x=(x1, x2, x3, x4, xn)$, to a confidence that the input belongs to a class, that is, $f(x)=confidence(class)$. Such classification can employ a probabilistic and/or statistical-based analysis (e.g., factoring into the analysis utilities and costs) to prognose or infer an action that a user desires to be automatically performed. A support vector machine (SVM) is an example of a classifier that can be employed. The SVM operates by finding a hypersurface in the space of possible inputs, which hypersurface attempts to split the triggering criteria from the non-triggering events. Intuitively, this makes the classification correct for testing data that is near, but not identical to training data. Other directed and undirected model classification approaches include, e.g., naive Bayes, Bayesian networks, decision trees, neural networks, fuzzy logic models, and probabilistic classification models providing different patterns of independence can be employed. Classification as used herein also is inclusive of statistical regression that is utilized to develop models of priority.

The state transition logic component 102 can further utilize a presentation component 804 that provides various types of user interfaces to facilitate interaction between a user and any component coupled to the state transition logic component 102. As depicted, the presentation component 804 is a separate entity that can be utilized with the state transition logic component 102. However, it is to be appreciated that the presentation component 804 and/or similar view components can be incorporated into the state transition logic component 102 and/or a stand-alone unit. The presentation component 804 can provide one or more graphical user interfaces (GUIs), command line interfaces, and the like. For example, a GUI can be rendered that provides a user with a region or means to load, import, read, etc., data, and can include a region to present the results of such. These regions can comprise known text and/or graphic regions comprising dialogue boxes, static controls, drop-down-menus, list boxes, pop-up menus, as edit controls, combo boxes, radio buttons, check boxes, push buttons, and graphic boxes. In addition, utilities to facilitate the presentation such as vertical and/or horizontal scroll bars for navigation and toolbar buttons to determine whether a region will be viewable can be employed. For example, the user can interact with one or more of the components coupled and/or incorporated into the state transition logic component 102.

The user can also interact with the regions to select and provide information via various devices such as a mouse, a roller ball, a keypad, a keyboard, a pen and/or voice activation, for example. Typically, a mechanism such as a push button or the enter key on the keyboard can be employed subsequent entering the information in order to initiate the search. However, it is to be appreciated that the claimed subject matter is not so limited. For example, merely highlighting a check box can initiate information conveyance. In another example, a command line interface can be employed. For example, the command line interface can prompt (e.g., via a text message on a display and an audio tone) the user for information via providing a text message. The user can than provide suitable information, such as alpha-numeric input corresponding to an option provided in the interface prompt or an answer to a question posed in the prompt. It is to be appreciated that the command line interface can be employed in connection with a GUI and/or API. In addition, the command line interface can be employed in connection with hardware (e.g., video cards) and/or displays (e.g., black and white, and EGA) with limited graphic support, and/or low bandwidth communication channels.

Figure 9:
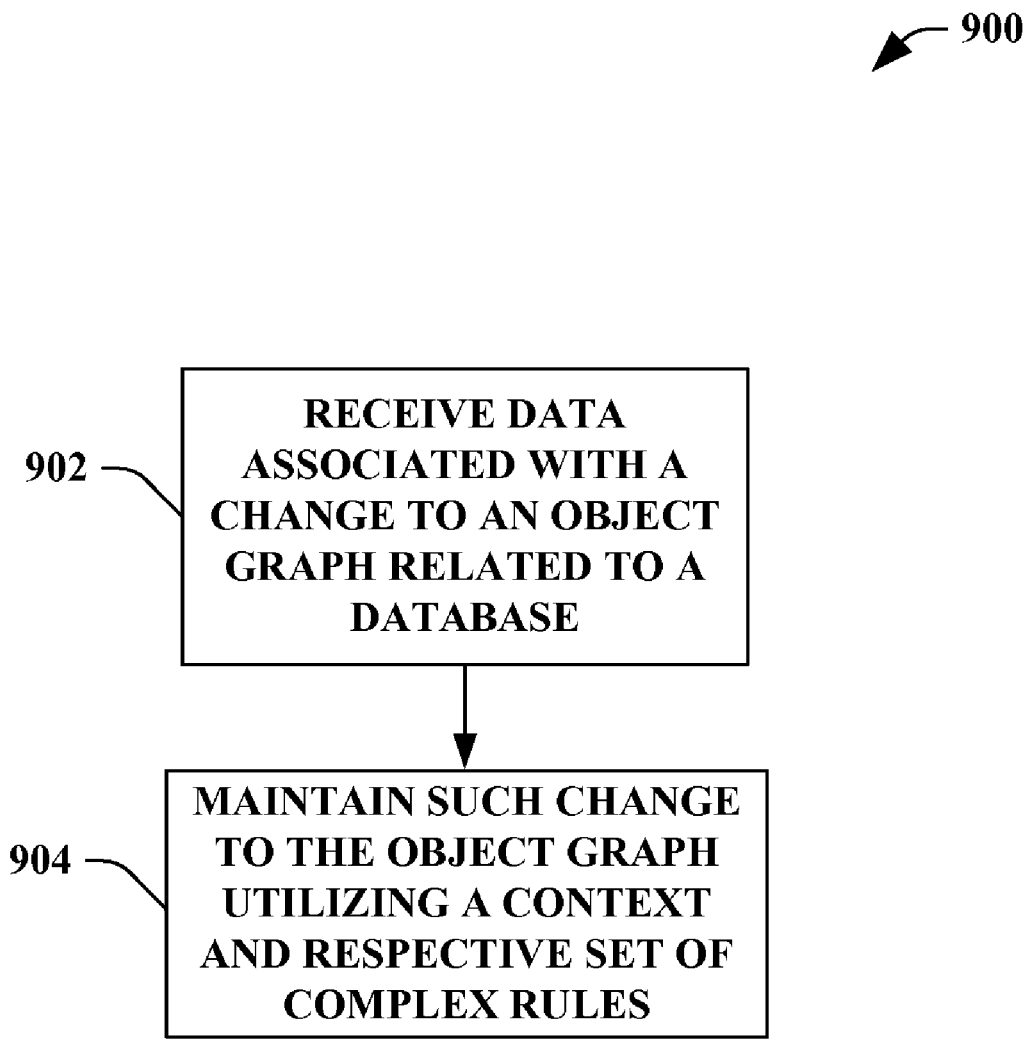
FIG. 9 illustrates an exemplary methodology for employing manipulating data utilizing an object graph based at least in part upon a context and a respective set of rules.
Figure 10:
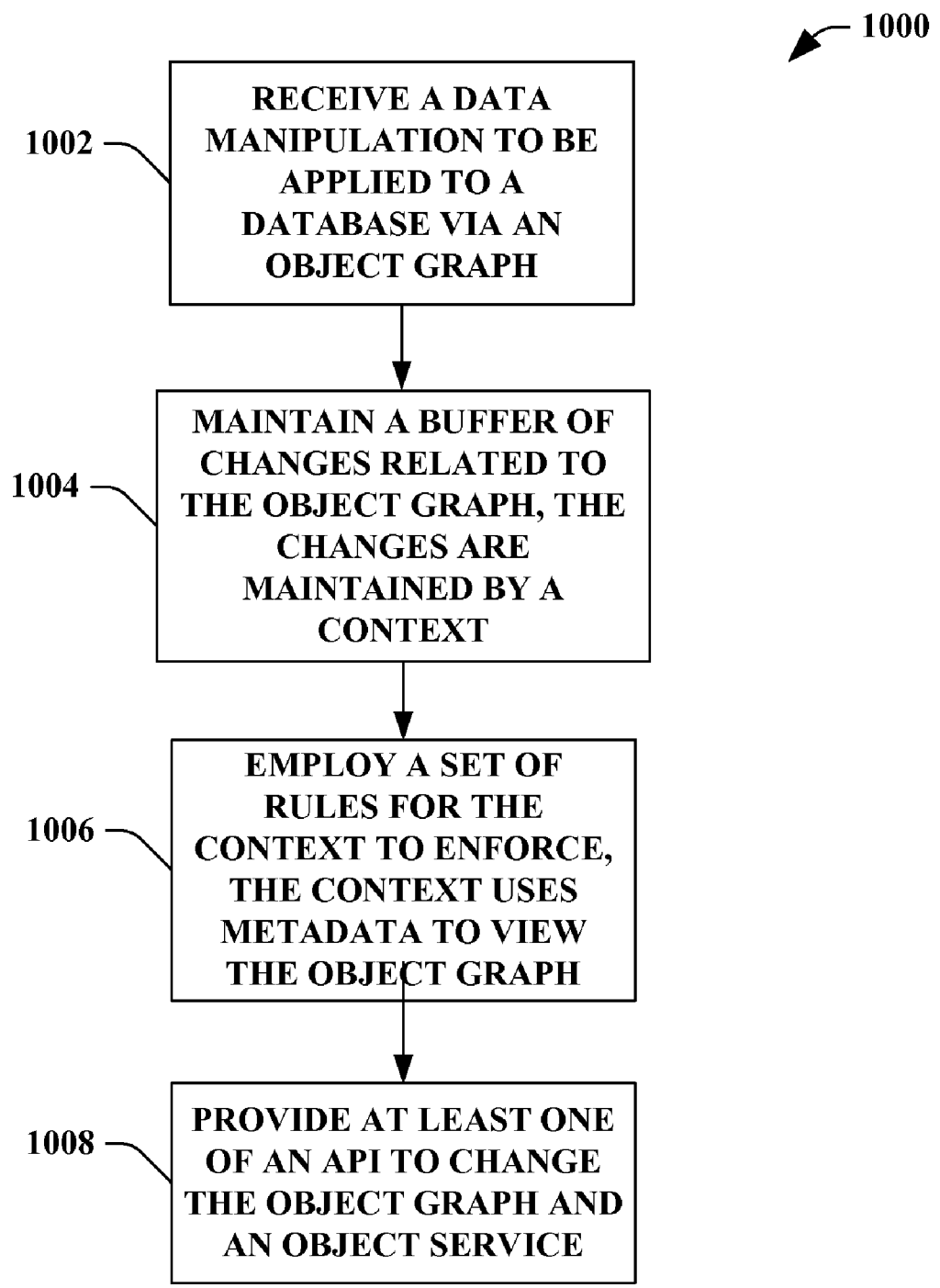
FIG. 10 illustrates an exemplary methodology that facilitates utilizing a complex set of rules to maintain a context related to an object graph to enable manipulation of data.

FIGS. 9-10 illustrate methodologies in accordance with the claimed subject matter. For simplicity of explanation, the methodologies are depicted and described as a series of acts. It is to be understood and appreciated that the subject innovation is not limited by the acts illustrated and/or by the order of acts, for example acts can occur in various orders and/or concurrently, and with other acts not presented and described herein. Furthermore, not all illustrated acts may be required to implement the methodologies in accordance with the claimed subject matter. In addition, those skilled in the art will understand and appreciate that the methodologies could alternatively be represented as a series of interrelated states via a state diagram or events. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

FIG. 9 illustrates a methodology 900 for employing manipulating data utilizing an object graph based at least in part upon a context and a respective set of rules. At reference numeral 902, data associated with a change to an object graph related to a database can be received. The data can be, but is not limited to, an instruction, a manipulation to data, a request to change data, any suitable data related to a change within a buffer, any suitable data related to a change in a context, any suitable data related to a change with an object graph, an instruction related to a manipulation to data, any suitable data related to an entity data model, etc.

At reference numeral 904, such change to the object graph can be maintained utilizing a context and respective set of complex rules. The context can manage the object graph, wherein the context can utilize metadata to view the object graph with the abstraction of at least one of an entity and/or a relationship (e.g., discussed infra). The set of state transitions rules is complex, particularly with regards to handling references between objects in an object graph. The context can provide the following operations:

a. Add Object—Adds an object to the context
b. Delete Object—Marks an object as deleted in the context, and disconnects the object from the object graph
c. AcceptChanges—Performs the following state transitions:
 i. Added→Unchanged
 ii. Modified→Unchanged
 iii. Deleted→Detached
d. RejectChanges—Performs the following state transitions:
 i. Added→Detached
 ii. Modified→Unchanged
 iii. Deleted→Unchanged Moreover, the context can enforce the following rules to objects within the context: 1) a detached object cannot be related to a non-detached object; and 2) a deleted object cannot be related to a non-deleted object.

It is to be appreciated that the subject innovation can be implemented with an entity data model (discussed supra). Specifically, the context can utilize metadata to view the object graph with the abstraction of entities and relationships. Entities describe real-world objects with independent existence, and are instances of Entity Types (e.g., Customer, Employee, book, shelf, keyboard, speaker, wall, house, street, globe, Earth, any suitable entity that can be a real-world object, etc.). Relationships are instances of Relationship Types, and express linkages between instances of two or more entity types (e.g., Employee WorksFor Department, where Employee is an entity type, Department is an entity type, and WorksFor is the Relationship type).

FIG. 10 illustrates a methodology 1000 that facilitates utilizing a complex set of rules to maintain a context related to an object graph to enable manipulation of data. At reference numeral 1002, a data manipulation to be applied to a database via an object graph can be received. The object graph can be the primary manner of manipulating data within a database utilizing a cached view of such database. It is to be appreciated that the data received can be, but is not limited to being, an instruction, a manipulation to data, a request to change data, any suitable data related to a change within a buffer, any suitable data related to a change in a context, any suitable data related to a change with an object graph, an instruction related to a manipulation to data, any suitable data related to an entity data model, etc.

At reference numeral 1004, a buffer of changes related to the object graph can be maintained, wherein such changes can be maintained by a context. It is to be appreciated and understood that such changes can be flushed to the database or discarded. At reference numeral 1006, a set of rules for the context can be employed and the context can utilize metadata to view the object graph. The context can utilize metadata to view the object graph with the abstraction of entities and relationships.

In particular, the context can provide operations that adhere to the rules. For instance, the rules can be: 1) a detached object cannot be related to a non-detached object; and 2) a deleted object cannot be related to a non-deleted object. Moreover, the following operations can be provided: add object, delete object, accept changes, and reject changes. At reference numeral 1008, at least one of an application programming interface (API) and an object service can be provided. The object service can be at least one of a session, a materialization, a state management, and a query. In particular, the state management can include an identify map, a shadow state, and change tracking.

The object services can include an ObjectContext class that encapsulates the state associated with a session, and is the primary object that all other objects in ObjectServices deal with. It can act as a mapped conduit through which other objects communicate with the underlying provider. The ObjectContext class can be an aggregator of various other pieces—most specifically a connection, a cache, and metadata for the associated objects. An application may have more than one active session by creating multiple instances of ObjectContext.

Application objects can be mapped to (and from) EDM entities via an O-C Map. This mapping is managed by the Mapping Services component (not shown). The ObjectMaterializer class utilizes this mapping to materialize data returned from a .NET data provider as type CLR classes. ObjectServices can manage the state of all objects maintained within the cache. This supports the basic application pattern of: (a) query for some objects, (b) navigate and make changes to those objects, and (c) send the pending changes back to the database. In order to support this pattern the ObjectServices infrastructure provides the following 3 services: 1) Identity Map; 2) Shadow State; and 3) Change Tracking.

Object Services maintains an identity map that maps EDM entities into CLR objects (and vice versa). An identity map ensures that an object gets loaded only once in that session by keeping a reference to the loaded objects in a map. Loading the object only once ensures a consistent view of changes to that object across references returned by multiple implicit or explicit queries within a context. The use of the identity map results in no duplicated materializations during queries as well as during implicit object loads during an object graph traversal.

Object Services, using the ObjectStateEntry and EntityKey classes, can maintain bookkeeping information for each object loaded into a session. The ObjectStateEntry class manages the original vs. current values of the data and the state of the object relatives to the database (e.g., Added, Modified, Deleted, Unchanged, Detached). The EntityKey class encapsulates the database identity of the object. This shadow state can keep track of the original values of the object properties (e.g., including EDM properties that were not mapped into the object). The ObjectStateManager associates objects and shadow state via an identity map. Having the set of current values of properties and the set of original values, it is possible to automatically identify a changed object. The ObjectStateEntry class can manage the current state of the object relative to the data contained within the database and/or data store. It also allows a given property to be marked as changed, without actually having to change the data associated with that property.

In addition, the object service can further employ a query function. Applications formulate their queries in terms of application objects. Queries may be issued in terms of LINQ expression trees or eSQL query strings. LINQ and eSQL queries are translated into canonical command trees in terms of the EDM, and delegated to the underlying provider (e.g. the Mapping Provider). eSQL query strings are parsed into canonical commands by a parsing service used by the Mapping Provider and LINQ trees are translated to canonical command trees by, for instance, a separate translation component. The results of the queries can be materialized into CLR objects by the Object Materializer, and then returned to the user.

Figure 11:
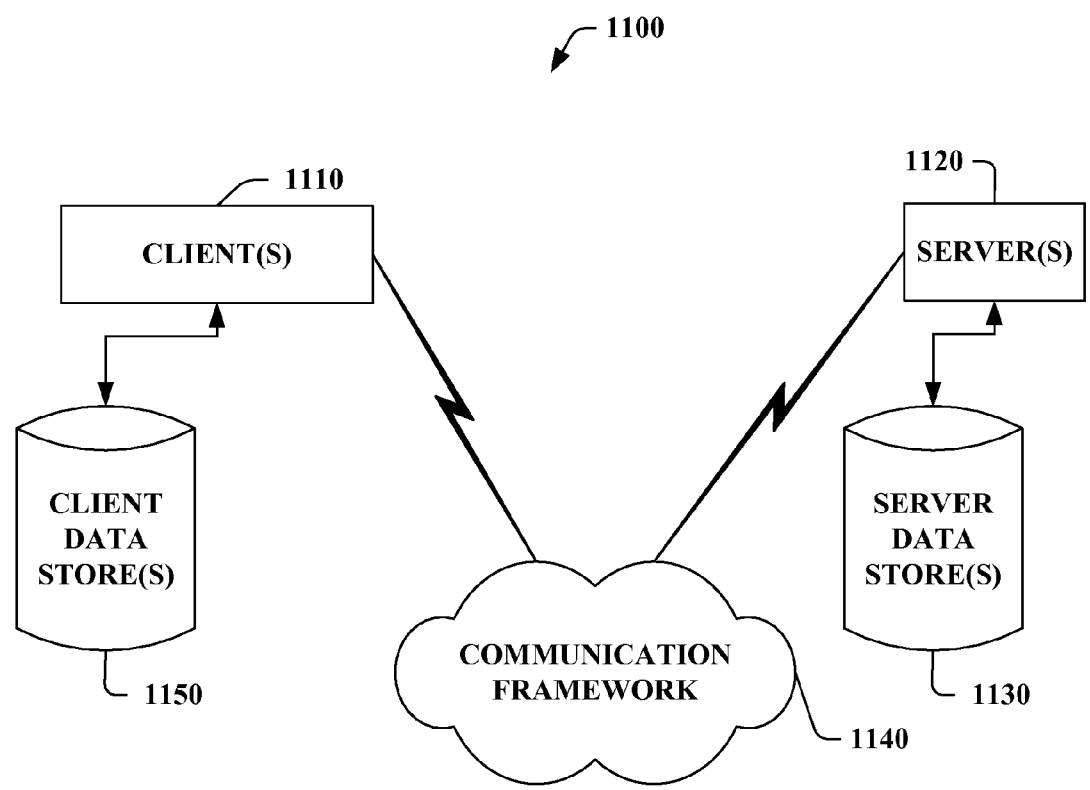
FIG. 11 illustrates an exemplary networking environment, wherein the novel aspects of the claimed subject matter can be employed.
Figure 12:
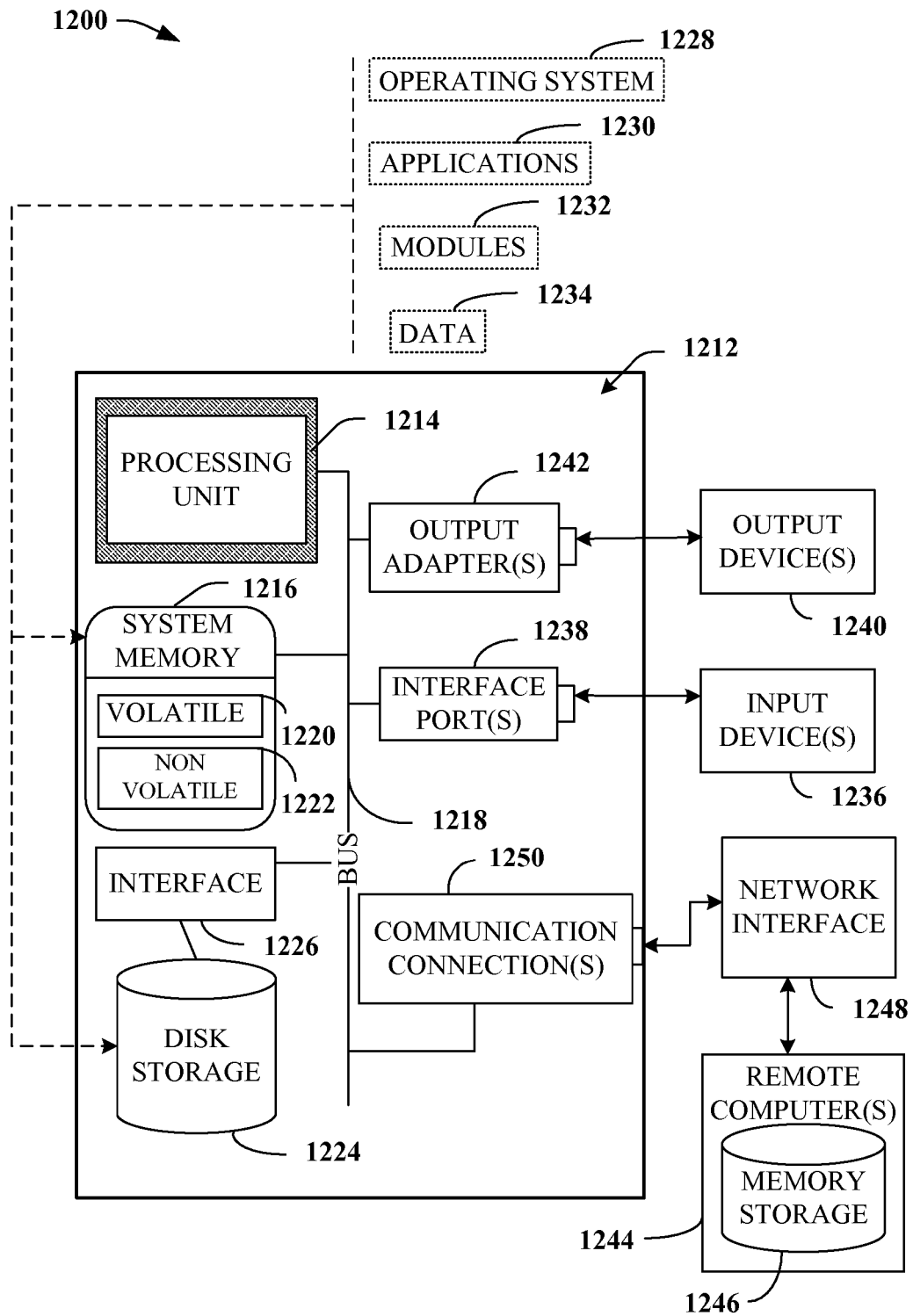
FIG. 12 illustrates an exemplary operating environment that can be employed in accordance with the claimed subject matter.

In order to provide additional context for implementing various aspects of the claimed subject matter, FIGS. 11-12 and the following discussion is intended to provide a brief, general description of a suitable computing environment in which the various aspects of the subject innovation may be implemented. For example, a state transition logic component that facilitates manipulating data utilizing an object graph based at least in part upon a context and a respective set of rules, as described in the previous figures, can be implemented in such suitable computing environment. While the claimed subject matter has been described above in the general context of computer-executable instructions of a computer program that runs on a local computer and/or remote computer, those skilled in the art will recognize that the subject innovation also may be implemented in combination with other program modules. Generally, program modules include routines, programs, components, data structures, etc., that perform particular tasks and/or implement particular abstract data types.

Moreover, those skilled in the art will appreciate that the inventive methods may be practiced with other computer system configurations, including single-processor or multi-processor computer systems, minicomputers, mainframe computers, as well as personal computers, hand-held computing devices, microprocessor-based and/or programmable consumer electronics, and the like, each of which may operatively communicate with one or more associated devices. The illustrated aspects of the claimed subject matter may also be practiced in distributed computing environments where certain tasks are performed by remote processing devices that are linked through a communications network. However, some, if not all, aspects of the subject innovation may be practiced on stand-alone computers. In a distributed computing environment, program modules may be located in local and/or remote memory storage devices.

FIG. 11 is a schematic block diagram of a sample-computing environment 1100 with which the claimed subject matter can interact. The system 1100 includes one or more client(s) 1110. The client(s) 1110 can be hardware and/or software (e.g., threads, processes, computing devices). The system 1100 also includes one or more server(s) 1120. The server(s) 1120 can be hardware and/or software (e.g., threads, processes, computing devices). The servers 1120 can house threads to perform transformations by employing the subject innovation, for example.

One possible communication between a client 1110 and a server 1120 can be in the form of a data packet adapted to be transmitted between two or more computer processes. The system 1100 includes a communication framework 1140 that can be employed to facilitate communications between the client(s) 1110 and the server(s) 1120. The client(s) 1110 are operably connected to one or more client data store(s) 1140 that can be employed to store information local to the client(s) 1110. Similarly, the server(s) 1120 are operably connected to one or more server data store(s) 1130 that can be employed to store information local to the servers 1120.

With reference to FIG. 12, an exemplary environment 1200 for implementing various aspects of the claimed subject matter includes a computer 1212. The computer 1212 includes a processing unit 1214, a system memory 1216, and a system bus 1218. The system bus 1218 couples system components including, but not limited to, the system memory 1216 to the processing unit 1214. The processing unit 1214 can be any of various available processors. Dual microprocessors and other multiprocessor architectures also can be employed as the processing unit 1214.

The system bus 1218 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1294), and Small Computer Systems Interface (SCSI).

The system memory 1216 includes volatile memory 1220 and nonvolatile memory 1222. The basic input/output system (BIOS), containing the basic routines to transfer information between elements within the computer 1212, such as during start-up, is stored in nonvolatile memory 1222. By way of illustration, and not limitation, nonvolatile memory 1222 can include read only memory (ROM), programmable ROM (PROM), electrically programmable ROM (EPROM), electrically erasable programmable ROM (EEPROM), or flash memory. Volatile memory 1220 includes random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM).

Computer 1212 also includes removable/non-removable, volatile/non-volatile computer storage media. FIG. 12 illustrates, for example a disk storage 1224. Disk storage 1224 includes, but is not limited to, devices like a magnetic disk drive, floppy disk drive, tape drive, Jaz drive, Zip drive, LS-100 drive, flash memory card, or memory stick. In addition, disk storage 1224 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1224 to the system bus 1218, a removable or non-removable interface is typically used such as interface 1226.

It is to be appreciated that FIG. 12 describes software that acts as an intermediary between users and the basic computer resources described in the suitable operating environment 1200. Such software includes an operating system 1228. Operating system 1228, which can be stored on disk storage 1224, acts to control and allocate resources of the computer system 1212. System applications 1230 take advantage of the management of resources by operating system 1228 through program modules 1232 and program data 1234 stored either in system memory 1216 or on disk storage 1224. It is to be appreciated that the claimed subject matter can be implemented with various operating systems or combinations of operating systems.

A user enters commands or information into the computer 1212 through input device(s) 1236. Input devices 1236 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1214 through the system bus 1218 via interface port(s) 1238. Interface port(s) 1238 include, for example, a serial port, a parallel port, a game port, and a universal serial bus (USB). Output device(s) 1240 use some of the same type of ports as input device(s) 1236. Thus, for example, a USB port may be used to provide input to computer 1212, and to output information from computer 1212 to an output device 1240. Output adapter 1242 is provided to illustrate that there are some output devices 1240 like monitors, speakers, and printers, among other output devices 1240, which require special adapters. The output adapters 1242 include, by way of illustration and not limitation, video and sound cards that provide a means of connection between the output device 1240 and the system bus 1218. It should be noted that other devices and/or systems of devices provide both input and output capabilities such as remote computer(s) 1244.

Computer 1212 can operate in a networked environment using logical connections to one or more remote computers, such as remote computer(s) 1244. The remote computer(s) 1244 can be a personal computer, a server, a router, a network PC, a workstation, a microprocessor based appliance, a peer device or other common network node and the like, and typically includes many or all of the elements described relative to computer 1212. For purposes of brevity, only a memory storage device 1246 is illustrated with remote computer(s) 1244. Remote computer(s) 1244 is logically connected to computer 1212 through a network interface 1248 and then physically connected via communication connection 1250. Network interface 1248 encompasses wire and/or wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1250 refers to the hardware/software employed to connect the network interface 1248 to the bus 1218. While communication connection 1250 is shown for illustrative clarity inside computer 1212, it can also be external to computer 1212. The hardware/software necessary for connection to the network interface 1248 includes, for exemplary purposes only, internal and external technologies such as, modems including regular telephone grade modems, cable modems and DSL modems, ISDN adapters, and Ethernet cards.

What has been described above includes examples of the subject innovation. It is, of course, not possible to describe every conceivable combination of components or methodologies for purposes of describing the claimed subject matter, but one of ordinary skill in the art may recognize that many further combinations and permutations of the subject innovation are possible. Accordingly, the claimed subject matter is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the claimed subject matter. In this regard, it will also be recognized that the innovation includes a system as well as a computer-readable medium having computer-executable instructions for performing the acts and/or events of the various methods of the claimed subject matter.

In addition, while a particular feature of the subject innovation may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

What is claimed is:

1. A system that facilitates handling a change associated with a database, comprising at least a processor executing the following components:
   an interface that receives data associated with a change to an object graph that is a cached view of the database; and
   a state transition logic component that maintains the change related to the object graph utilizing a context and a respective set of rules, wherein a rules component enforces the following set of rules to the object graph: 1) a detached object cannot be related to a non-detached object; and 2) a deleted object cannot be related to a non-deleted object, the context employs metadata to view the object graph with an abstraction of at least one of an entity or a relationship.

2. The system of claim 1, further comprising at least one of the following: the entity is a real-world object with independent existence and is an instance of the entity type; or the relationship is an instance of the relationship type and expresses a linkage between instances of two or more entity types.

3. The system of claim 2, further comprising an association relationship that models and implements a peer-to-peer relationship between at least two entities.

4. The system of claim 2, further comprising a containment relationship that models and implements a parent-child relationship between at least two entities.

5. The system of claim 1, the object graph utilizes a buffer to tabulate the change, such change is maintained by the context.

6. The system of claim 1, the change is at least one of flushed to the database or discarded.

7. The system of claim 1, further comprising the rules component employs at least one of the following operations: 1) add an object; 2) delete object; 3) accept change; or 4) reject change.

8. The system of claim 7, the operation add an object is implemented to at least one of the following: an object that is detached; an object that is already added; an object that is unchanged/modified; or an object that is deleted.

9. The system of claim 7, the operation delete object is implemented to at least one of the following: an object that is unchanged/modified; or an object that is in a state of at least one of added, deleted, or detached.

10. The system of claim 7, further including a transitive add operation that provides a creation of a relationship between a detached object and a non-detached object which transitions the detached object to an added state.

11. The system of claim 7, further including a child deletion operation that provides a deletion of a relationship in a parent-child relationship will delete the child.

12. The system of claim 7, further including a re-parenting relationship operation that provides a creation of a new parent-child relationship to a child object which participates in an existing parent-child relationship, the existing parent-child relationship is cauterized based on the creation of the new parent-child relationship.

13. The system of claim 7, further including a re-adding deleted object operation that provides at least one of an addition of a deleted object to a context, or an addition of a deleted object via a relationship that transitions the object back to an unchanged state.

14. The system of claim 1, the state transition logic component utilizes an object state transition with the following states: an added state; a detached state; a deleted state, an unchanged state; and a modified state.

15. The system of claim 14, further comprising the following: an accept between the added state and the unchanged state; at least one of a modify, an accept, or a reject between the unchanged state and the modified state; at least one of a delete and an add between the added state and the detached state; an accept between the detached state and the deleted state; at least one of an add, a reject, and a delete between the unchanged state and the deleted state; or a delete between the deleted state and the modified state.

16. A computer-implemented method that facilitates maintaining a manipulation associated with data, comprising:
    receiving data associated with a change to an object graph related to a database, wherein the change to the object graph is executed by a processor; and
    maintaining and handling the change to the object graph utilizing a context and respective set of rules, wherein the rules are 1) a detached object cannot be related to a non-detached object; and 2) a deleted object cannot be related to a non-deleted object, the context employs metadata to view the object graph with an abstraction of at least one of an entity or a relationship.

17. The system of claim 16, further comprising employing at least one of the following operations: 1) add an object; 2) delete object; 3) accept change; 4) reject change.

18. A computer-implemented system that facilitates maintaining a manipulation associated with data, comprising the following components stored in computer memory and executable by a processor:
    means for receiving data associated with a change to data in a database via an object graph executed by a processor, the object graph is a cached view of the database; and
    means for maintaining the change related to the object graph utilizing a processor, a context and a respective set of rules, wherein the rules are 1) a detached object cannot be related to a non-detached object; and 2) a deleted object cannot be related to a non-deleted object, the context employs metadata to view the object graph with an abstraction of at least one of an entity or a relationship.

* * * * *